United States Patent [19]

Gershenfeld

[11] Patent Number: 5,247,261

[45] Date of Patent: Sep. 21, 1993

[54] METHOD AND APPARATUS FOR ELECTROMAGNETIC NON-CONTACT POSITION MEASUREMENT WITH RESPECT TO ONE OR MORE AXES

[75] Inventor: Neil A. Gershenfeld, Cambridge, Mass.

[73] Assignee: The Massachusetts Institute of Technology, Cambridge, Mass.

[21] Appl. No.: 773,848

[22] Filed: Oct. 9, 1991

[51] Int. Cl.$^5$ .................. G01R 27/26; G08C 21/00
[52] U.S. Cl. .................. 324/716; 340/870.37; 324/660; 324/687; 324/713; 324/207.17; 178/19; 84/733
[58] Field of Search ............ 324/649, 650, 660, 662, 324/683, 686, 687, 690, 699, 716, 709, 724; 340/870.37, 870.38; 84/733, 734, 735, 737, 742; 178/18, 19

[56] References Cited

U.S. PATENT DOCUMENTS

| | | | |
|---|---|---|---|
| 4,303,919 | 12/1981 | Dimeff | 324/660 X |
| 4,562,430 | 12/1985 | Robinson | 324/660 |
| 4,733,235 | 3/1988 | Baer et al. | 324/660 |
| 4,743,902 | 5/1988 | Andermo | 324/660 |
| 4,980,519 | 12/1990 | Mathews | |

Primary Examiner—Gerard R. Strecker
Assistant Examiner—Diep Do
Attorney, Agent, or Firm—Steven J. Weissburg

[57] ABSTRACT

A preferred embodiment of the invention is an apparatus for measuring the position of a point with respect to at least one axis. The apparatus includes a reference electrode located at the reference point and at least one axial electrode fixed along the at least one axis. The axial electrode has a signal transmission property, such as resistivity, as measured between a first end and a point along the axis, which signal transmission property varies with the location of the point of measurement. The axial electrode is coupled to the reference electrode, typically capacitively. The apparatus also includes means for applying an electric signal to the reference electrode; means for measuring an output electric signal at the first end of the at least one axial electrode; and means for evaluating the relation between the output electric signal and the input electric signal to determine the position of the reference point relative to the axis. The invention also includes method of using the apparatus to determine the location of the reference point to the axis. The invention includes embodiments of one and more axes.

16 Claims, 7 Drawing Sheets

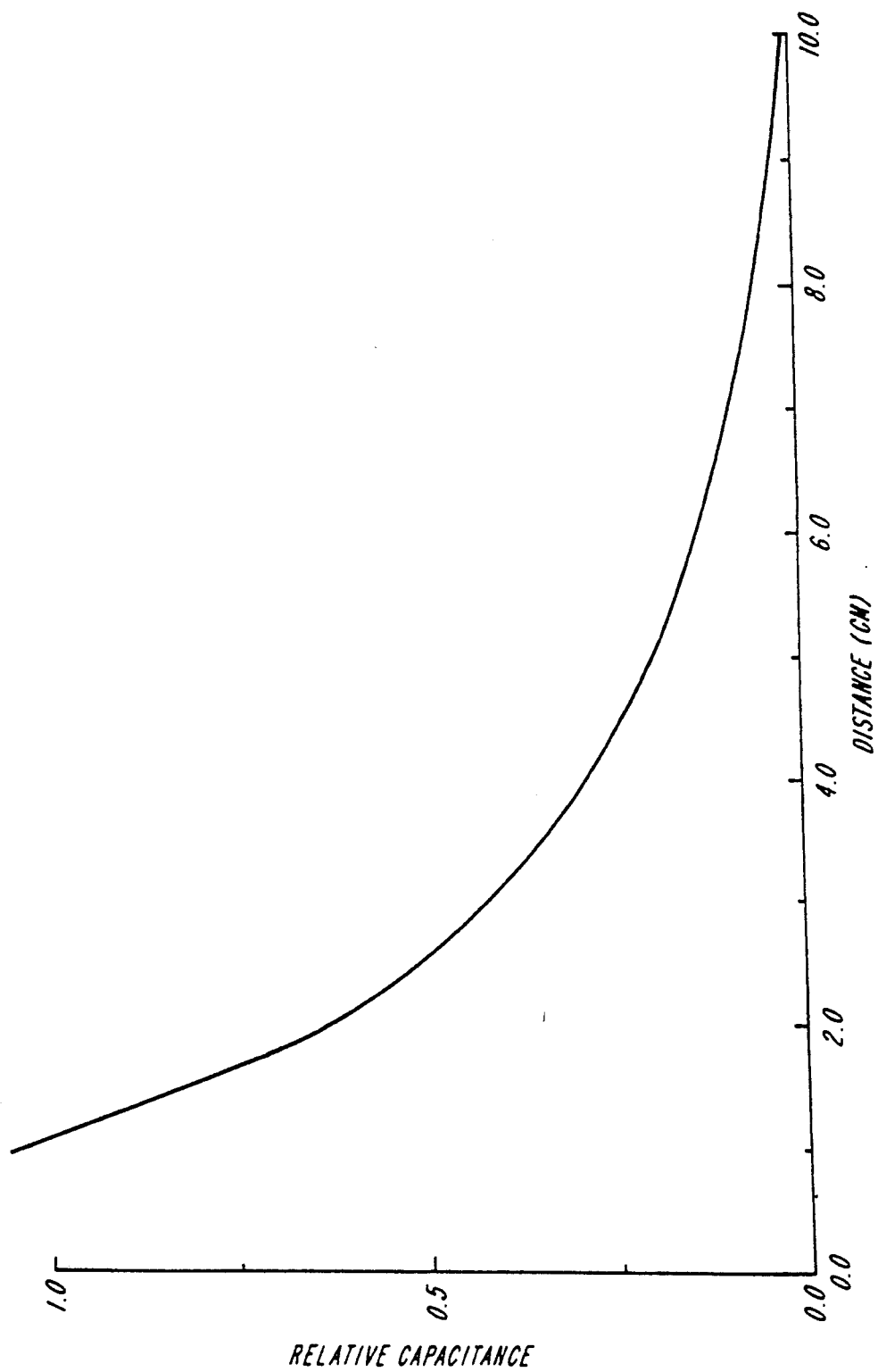

METHOD AND APPARATUS FOR ELECTROMAGNETIC NON-CONTACT POSITION MEASUREMENT WITH RESPECT TO ONE OR MORE AXES

This invention relates to an apparatus and a method for measuring position with respect to one or more axes. More specifically, the invention relates to measuring the position of a point with respect to one or more axes or the orientation of a rigid object defined by at least two such points. The invention also relates to measuring the orientation of an axis with respect to another axis. The invention has applications in many fields, including machine tool operation and analyzing the interface between humans and machines or instruments, including computers.

BACKGROUND OF THE INVENTION

It is often necessary to be able to measure the location of a point with respect to one or more axes. For instance, in machine tool operation, it is necessary to locate the tool or the workpiece, both of which can be considered to be points, with respect to the stage of the machine, which can be considered to be defined by one, two or three axes, depending on the machine. As an example, with a lathe, the cutting tool, a point, must be located with respect to the three axes of the machine. Human to computer interfaces also must identify the location of a point with respect to an axis. The input device of a stylus and pad uses a pair of axes extended in two dimensions, defining the pad, and a reference point, the tip of the stylus. In this application, the point "moves" from the perspective of the user, and the pad remains fixed. The problem may also be conceptualized as measuring the position of an object, extended in space along an axis, with respect to a fixed point. The principal example discussed below entails an axis of changing location and a fixed reference point.

The present invention was developed during the course of analyzing the interface between humans and musical instruments, in particular a bowed string instrument such as the cello. It is desireable to be able to unobtrusively and precisely map various aspects of play, including the bow pressure, bow/wrist orientation, finger position on the strings and the position of the cellist's bow with respect to a fixed point on the cello, for instance the bridge. These are quantifiable aspects of the gestures that the cellist applies to the instrument. Knowing this information, the investigator can analyze the gestures that the cellist uses, and can map those gestures to the music that the cello produces in response. The information is used to understand the techniques of instrumentalists, both accomplished and beginners. The information is also used to generate a real-time performance on an electronic instrument, that recreates the sound of a cello and of other instruments, both real and electronic only.

The present invention takes advantage of the near field electromagnetic effect and thus can be used in instances where the range of motion to be studied is on the order of the same size as the antennae used to analyze the motion. Thus, appropriate candidates for such a method of study are those where an antenna, which is of the appropriate size, can be placed. For example, valuable information may be gained from mapping the swing of a golf club, baseball bat or tennis racquet. Each of the foregoing is an appropriate structure upon which to mount an antenna. In each case, a second antenna would be mounted at a known position, for instance on the athlete. Knowledge of the general motions of a person with respect to a computer input device also has wide applicability in the control of computers. The foregoing lists only some of the most obvious instances of application of the present invention.

To measure the position of an extended object with respect to a reference point, (or of a point with respect to an axis) it is necessary to be able to measure two distances for an object moving in the two dimensions of a plane and three distances (or two distances and an angle) for an object moving in three-dimensional space. Several techniques have been proposed, however, none are deemed to be adequate for a delicate application, such as measuring the position of a cellist's bow during play.

Acoustic sonar analysis, measuring the propagation time of an ultrasonic sound pulse in the air, requires bulky equipment. It is also very difficult to accomplish without coupling some energy into the audible range, which would interfere with the acoustical signal, i.e. the music, generated by the cello. Acoustic phase analysis, measuring the phase shift in a received audio signal, has the same problems as acoustic sonar analysis. Infrared strength analysis, measuring the fall-off in signal strength between an infrared diode and detector, can be done compactly. However, it requires maintaining a direct line-of-sight between the source and detector, and is sensitive to stray reflections. Due to the motion of the cellist's bow, particularly the rotation and rocking of the bow, a direct line-of-sight is not always available. Inductance proximity analysis, measuring the eddy-current coupling emerging from a coil, is limited to distances on the order of the size of the coil, typically, one centimeter, a scale that is too small for analysis of the position of a cello bow and many other human/instrument interface questions. Microwave reflectivity analysis, measuring the reflected microwave signal transmission time, requires a well-characterized target of stable geometry. The rotating and twisting motion of the cello bow renders it an unsuitable target for microwave radiation.

U.S. Pat. No. 4,980,519, issued to Max V. Mathews on Dec. 25, 1990 and assigned to the Trustees of Stanford University discloses an electronic "drum" that is excited by one or more batons. Each baton transmits a signal of a distinct radio frequency from a position in space. The x, y, and z position of the transmitter with respect to the "drum" can be determined. The drum has a flat surface, carrying at least two pairs of electrodes. Both pairs of electrodes are shaped so that the degree of capacitive coupling between each baton transmitter and the pairs of electrodes corresponds to the position of the transmitter in the x and y direction. The z position (distance away from the drum) is determined computationally.

The two pairs of electrodes on the drum must be positioned so that neither shields the other. It is also necessary that they be shaped so that the capacitance established between the baton and the electrodes varies with the location of the baton. The electrodes are made up of interlaced adjacent triangles, much like the pattern on a backgammon game board. One member of a pair of electrodes consists of several triangles of varying sizes, each having one short side and two longer sides. The short sides are aligned in line with each other, with the longer sides all extending away from the short side in the same direction. The other member of the electrode pair is similarly shaped, and is arranged with the short sides of the triangles parallel to the short sides of the first member, and with the longer sides pointing toward the first electrode, so that the points of the triangles interleave.

The variation in shape and size is important. Such a scheme is not feasible for measurement of the position of long slender extended objects, such as a cellist's bow, a conductor's baton or a golf club, because there is not enough surface area on the extended object upon which to locate an electrode of varying shape.

Another known apparatus for determining the position of a point relative to a reference uses two transmitting antennae and a single receiving antenna. This device takes advantage of the capacitive linkage between the transmitting antennae and the receiving antenna. By transmitting signals of two different frequencies, it is possible to determine the distance (in a plane) of the receiving antenna from each of the transmitting antennae, and thus its position. This technique does not work well for measuring the position with respect to an axis extending over a distance larger than the characteristic length of the capacitive effect. This length is on the order of the size of the antenna, typically 10–30 cm for study of human machine interfaces. Therefore, using only two antennae, it would not be practical to determine the position, in the direction of its length, of a twenty cm. long cello bow, moving through a range of twice its length, with respect to the bridge. To do so would require antennae too large to be conveniently applied to the cello. It would be necessary to locate a receiving antenna approximately every ten cm. along the length of the bow.

It will be understood that, while the following discussion addresses locating the position of the bow (the axis) with respect to the bridge (the point) a more general application is determining the location of a point with respect to one or more axes. However, it is more natural to speak of determining the location of the cello bow with respect to the bridge, since it is the bow that moves, relative to a human observer. For other applications, however, it is more natural to regard the point as moving with respect to one or more axes.

OBJECTS OF THE INVENTION

Thus, the several objects of the invention include to provide an apparatus for the measurement of the position of an extended object that: is accurate at distances on the scale of the interaction between humans and instruments; does not itself generate a signal that would interfere with a signal produced by the human/instrument under study; is light weight and robust; operates in the absence of a direct line-of-sight; can be used on extended objects having two small dimensions; is inexpensive to manufacture and implement; can be used to measure position with respect to one, two and three axes; is compact enough so as not to disrupt an artist or athlete during performance; responds quickly; and that uses sensors that are easy to install and remove.

BRIEF DESCRIPTION OF THE INVENTION

A first preferred embodiment of the invention is an apparatus for measuring the position of a point with respect to at least one axis, the apparatus comprising: a reference electrode located at the reference point; and at least one axial electrode fixed along the at least one axis, the axial electrode having a signal transmission property as measured between a first end and a point along the axis, which signal transmission property varies with the location of the point of measurement. The axial electrode is coupled to the reference electrode. The apparatus also includes means for applying an electric signal to the reference electrode; means for measuring an output electric signal at the first end of the at least one axial electrode; and means for evaluating the relation between the output electric signal and the input electric signal to determine the position of the reference point relative to the axis. In a second preferred embodiment, the transmission property is the resistance of the axial electrode, and the coupling is capacitive.

A third preferred embodiment of the invention is a method for measuring the position of a reference point with respect to at least one axis, the method comprising the steps of: providing a reference electrode located at the reference point; at least one axial electrode fixed along the at least one axis, the axial electrode having a signal transmission property as measured between a first end and a point along the axis, which signal transmission property varies with the location of the point of measurement; The axial electrode is coupled to the reference electrode. The method further includes the steps of applying an electric signal to the reference electrode, measuring an output electric signal at the first end of the at least one axial electrode; and evaluating the relation between the output electric signal and the input electric signal to determine the position of the reference point relative to the axis.

BRIEF DESCRIPTION OF THE FIGURES

FIG. 6 is a schematic representation of the relation between capacitance and distance from antenna for a typical embodiment of the invention.

DETAILED DESCRIPTION OF PREFERRED EMBODIMENTS OF THE INVENTION

Figure 1:
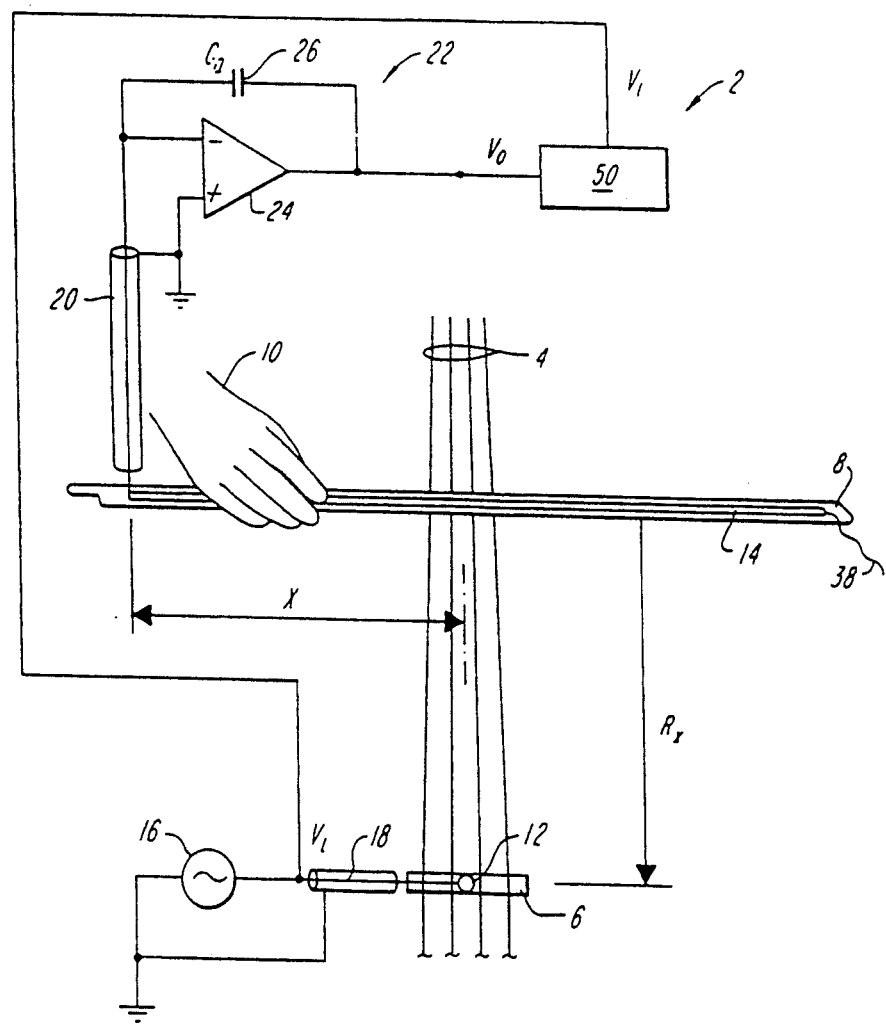
FIG. 1 is a schematic representation of an embodiment of the apparatus of the invention associated with a cello.

The invention will be understood with reference to the following discussion and the accompanying figures. A preferred embodiment of the invention is shown schematically in FIG. 1. A cello 2 is shown, showing only a portion of the strings 4 and bridge 6. A cellist's bow 8 is shown schematically being drawn across the strings 4 a distance $R_x$ away from the bridge 6. The cellist's hand 10 is shown grasping the bow. During play, the cellist moves the bow back and forth, generally in the direction of its length along axis x. This motion drags the hairs (not shown) of the bow 8 across the strings 4, setting the strings to vibration, which vibration is translated by the cello into sound. As used in this specification and the claims, change in placement along this direction is referred to as an "axial" change, for instance in the x direction. Change along this axis is measured from an arbitrary rest position, for instance, where the end of the bow nearest the hand 10 is centered over the strings 4.

The cellist also places the bow at different locations along the length of a string, sometimes nearer to the bridge, sometimes further away from the bridge. This placement affects qualities of the sound produced, such as timbre. Pitch is determined predominantly by stopping the strings by the cellist's fingers, not shown in FIG. 1. As used in this specification and the claims, change of placement along the direction generally perpendicular to the length of the bow (along the strings of the cello) is referred to as "radial" placement, for instance $R_x$ and is measured from the bow 8 to the bridge 6.

A short reference electrode 12 is used as a drive or transmitting antenna, oriented on the top of the bridge, generally perpendicular to both the strings 4 of the cello and the long dimension of the bow. A suitable length for the reference electrode is on the order of five cm. The reference electrode may be made from a conductive metal. A thin electrode 14 is mounted on the bow 8 and acts as a receiving antenna. The electrode 14 is on the order of fifteen cm. long, 0.030 in. thick and about 0.1 in. wide (for a cello bow of about twenty cm. long and 0.75 cm thick).

A signal generator 16 generates a steady state wave at approximately 100 kHz. The signal generator 16 is connected to the reference electrode 12 through grounded coaxial cable 18, to minimize interference and noise. A similarly shielded cable 20 connects the bow electrode 14 to an amplifier circuit 22, including an amplifier 24 and a capacitor 26 having a capacitance $C_a$. The amplifier is of the type commonly referred to as an operational amplifier. An output voltage $V_o$ is measured at the output of amplifier circuit 22. It is also beneficial to include additional circuitry after the output of amplifier circuit 22, as is discussed below.

At a drive frequency of approximately 100 kHz, the wavelength of the electromagnetic signal transmitted from the reference antenna 12 is on the order of three km. Since the wavelength is so relatively large, the entire measurement in the context of the cello is in the near field region. Consequently the only coupling between the reference electrode 12 and the bow electrode 14 is capacitive. The capacitance depends on the distance between the two antennae. At higher drive frequencies, the impedance of the capacitive linkage between the electrodes 12 and 14 decreases, which facilitates analysis, but gives rise to increased noise problems. Therefore, the drive frequency must be chosen to optimize these competing considerations.

For the embodiment to analyze a cellist's gestures, 100 kHz–1 MHz has been found to provide good results. In general, for distances between electrodes of between one inch and one foot, the capacitance is in the range of between 1 fF and 1 pF ($1 \times 10^{-15}$ F and $1 \times 10^{-12}$ F). At a constant frequency $\omega$ in the above range, the impedance of a capacitor is equal to the $1/i\omega C$. Thus, for the dimensions of the bow and the bridge, having a capacitance of 1 fF to 1 pF, and a frequency of 100 kHz, the impedance falls within the range of $1 \times 10^6$ ohms and $1 \times 10^{10}$ ohms.

Figure 2:
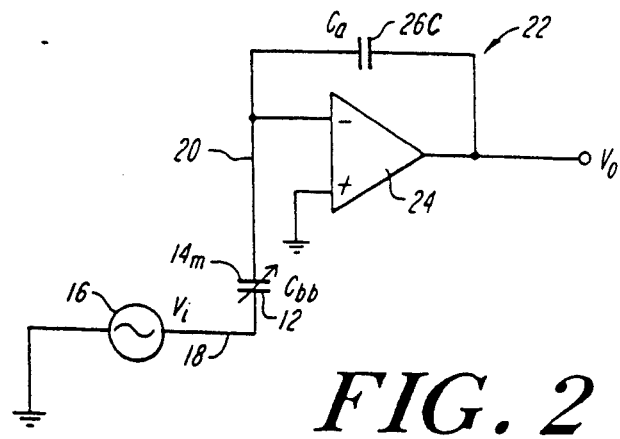
FIG. 2 is a schematic representation, for explanatory purposes only, of a modification of the embodiment of FIG. 1, with the combination of the bridge antenna and the bow antenna modelled as a capacitor and with the antenna located on the bow having zero resistance.

In order to show how the two antennae interact to give rise to a capacitive effect, it is helpful to analyze a modification of the invention, ignoring for the moment that the bow antenna is actually of a very high resistance. If the resistive element on the bow is considered to have zero resistance, the cello system shown in FIG. 1 is modelled in part by the capacitive circuit shown in FIG. 2. Like elements are identified by the same reference numeral as identify the elements in FIG. 1. The reference electrode 12 on the bridge of the cello is modelled as one electrode of capacitor $C_{bb}$ and the modified electrode $14_m$ extending along the bow is modelled as the other electrode of the same capacitor. The variation in the capacitance $C_{bb}$ is due to both the variation in distance between the modified bow electrode $14_m$ and the reference electrode 12, i.e. the radial distance away from the bow and variation in the axial placement of the bow.

Figure 3:
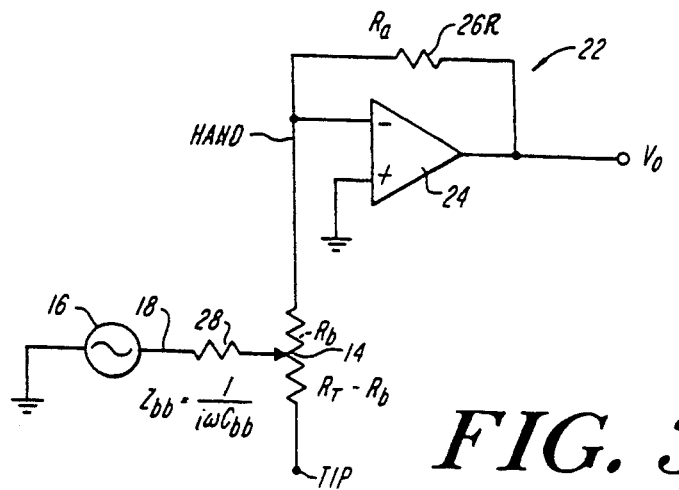
FIG. 3 is a schematic representation of the embodiment of FIG. 1, with the input signal being a constant frequency wave, the bow antenna having a significant resistance and showing the impedances of the circuit elements.

In order to determine both the axial and the radial position of the bow 8, it is necessary to analyze the relationship between the measured voltage $V_o$ at the output of the amplifier circuit 22 and the input voltage $V_i$ in light of the impedance of the circuit elements. FIG. 3 models the circuit elements as resistive elements, which is the case at a constant frequency $\omega$, such as is generated by signal generator 16. Again, signal generator 16 is connected through coaxial cable 18 to reference electrode 12. Reference electrode 12 is designed to have zero resistance, so, for the purpose of analyzing the resistive aspects of the circuit, it can be considered to be incorporated into coaxial cable 18. The impedance of the capacitance made up of reference electrode 12 and bow electrode 14 is modelled as a resistor 28, having an impedance $Z_{bb} = 1/i\omega C_{bb}$, with a phase shift of 90°. The capacitive linkage of the two antennae is modelled as an effective circuit element connecting the impedance of the capacitor made up of the two antennae as electrodes, to a point along the length of the bow electrode 14 closest to the center of the electric field. In reality, there is a field of capacitive linking of differing strength along a length of the resistive electrode. Thus, the situation can be modelled as numerous capacitors in parallel, each connected to a different point along the length of a resistive element. This circuit can be modelled as shown in FIG. 3.

Electrode 14 is a resistor having a resistance through its entire length of $R_T$ and a resistance of $R_b$ as measured from the end of the electrode 14 near the cellist's hand 10 to the location at which the capacitive coupling effectively interacts with the bow. As the cellist moves the bow axially, the length of the electrode that gives rise to the resistance $R_b$ will change, and thus the resistance will change. Analysis of the circuit shown in FIG. 3 gives rise to the following relationship:

$$V_o = -(R_a/(R_b+Z_{bb})) \times V_i \quad (1)$$

Substituting for $Z_{bb}$ yields:

$$V_o = -(R_a/(R_b+1/i\omega C_{bb})) \times V_i \quad (2)$$

From inspection of equations 1 and 2, it is understood that $R_b$ and $Z_{bb}$ must be comparable if each is to have a non-negligible effect on the output signal. $Z_{bb}$ at a frequency of 100 kHz is on the order of $10^9$ ohms. Thus, $R_b$ is chosen to be greater than $10^6$ ohms. It is desirable, if possible, to have $R_b$ and $Z_{bb}$ to be as close as possible to the same order of magnitude. However, for the cello application, economically obtainable and well behaved materials are available that can be fashioned into a resistor of only on the order of $10^6$ ohms. However, as additional materials become available, it will be advantageous to investigate their use. A suitable resistive element is of a polymer sold by Mitech of Twinsburg, Ohio under the trade designation M-411, having a resistivity of $10^{11}$ ohms cm. For the cello analysis, a length of material 0.03 in. thick and 0.1 in. wide was used. An advantage of the invention is that the resistive antenna may be "elongated," i.e. relatively long as compared to any other dimensions. It is beneficial for the elongated antenna to have an aspect ratio of at least 25 to 1.

As the bow position changes radially, i.e. toward or away from the bridge, $C_{bb}$ changes, and as the bow position changes axially, $R_b$ changes. Analysis of equation 2 shows how these changes affect $V_o$. However, because both affect $V_o$ in the same way, a technique must be applied to disentangle their respective contributions so that the axial and radial location of the bow can be determined. Equation 2 presents a single equation, having two unknowns, $R_b$ and $C_{bb}$.

Theoretically, at least two methods can be used to disentangle the change in signal due to the two different effects. According to one method, another wire is attached to the end of the bow electrode 14 that is nearest the tip of the bow. According to a second method, only one wire need be attached to the bow and a phase measurement is used. Both methods provide an additional equation in the two unknowns, thereby adequately specifying the situation for solution.

Figure 4:
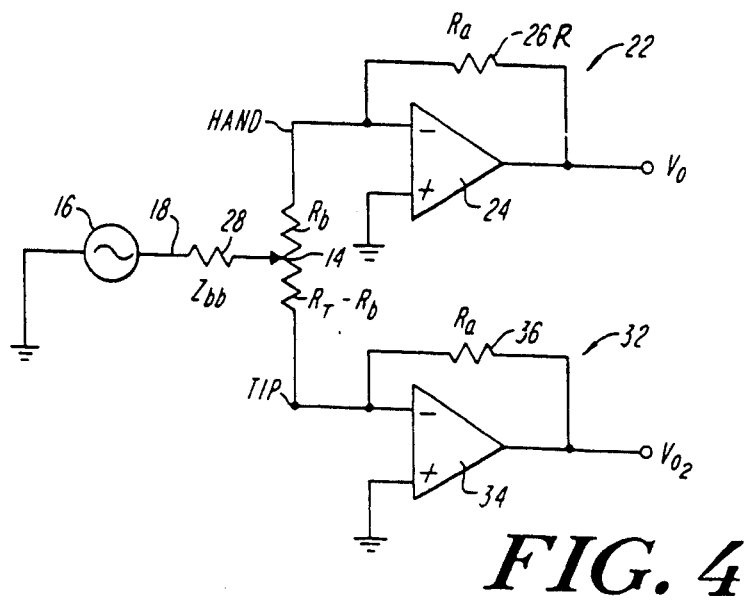
FIG. 4 is a schematic representation of an embodiment of the apparatus of the invention using two wires connected to the bow antenna.

The circuitry using the two wire method is shown schematically in FIG. 4. All is the same as the circuit shown in FIG. 3, except that an additional amplification circuit 32, having an amplifier 34 and a capacitor, modeled in this constant frequency situation as a resistor 36 having the same impedance as capacitor 26, modeled in this constant frequency situation as a resistor 26R, having a complex impedance $R_a = 1/i\omega C_a$, is added connected to the end of the bow electrode 14 nearest the tip of the bow 8. In FIG. 1, a wire 38 is shown connected to the end of electrode 14 for this purpose. The rest of the circuit is not shown in FIG. 1. Because the wire is connected to the free tip of the cellist's bow, the wire must be extremely light weight and small. Miniature coaxial cable sold by Cooner of Chatsworth, Calif., having an OD of 0.047, and capacitance of 29.5 pF/ft, sold under the trade designation AS 450-3650R has been found to be suitable.

Analysis of the portion of the circuit including amplifier 32 and the portion of the bow electrode 14 between the point of the effective capacitive coupling and the tip of the bow yields the following:

$$V_{o2} = -(R_a/((R_T-R_b)+Z_{bb})) \times V_i \quad (3)$$

Comparing equations 1 and 3, it will be observed that as the bow position changes axially, $V_{o2}$ and $V_o$ change in opposite directions, while as the bow position changes radially, both $V_o$ and $V_{o2}$ change in the same direction. With these two equations, 1 and 3, solutions for the two unknowns $R_b$ and $Z_{bb}$ can be determined.

Under certain conditions, knowing $R_b$ allows a direct determination of the axial location. When the radial separation between the axis and the reference point (the bow and the bridge in the cello example) is relatively small compared to the length of the axis (on the order of 2-3 cm for the cello example), all of the capacitive coupling takes place in a small length of the axial antenna. In that case, the effective resistance $R_b$ is very accurately characterized by the expression:

$$R_b = \rho x/A \quad (4)$$

where $\rho$ is the resistivity of the material, $A$ is its cross-sectional area and $x$ is the length through which the current passes, which is the length from the point of effective coupling through the field to the end of the bow 8 held by the player. Thus, in such situations, the axial distance $x$ equals $R_b A/\rho$. However, if the radial separation between the axis and the reference point is not on this small order, determination of the axial distance $x$ is more complicated, because the capacitive linking spans a greater expanse of the electrode 14. It is not accurate in such a situation to approximate the length according to the relation above. The technique for determining the axial location $x$ in these situations is discussed below.

Knowing the impedance $Z_{bb}$ allows calculation of the capacitance $C_{bb}$, which equals $1/i\omega Z_{bb}$. Once the capacitance is known, theoretically, the radial distance of the bow axis from the bridge antenna can be determined. Theoretically, for a pair of electrodes separated by an electric field potential difference of V, solution of Laplace's equation in free space subject to the appropriate boundary conditions for the bow antenna/bridge antenna geometry will provide the distance between the two electrodes.

Figure 5:
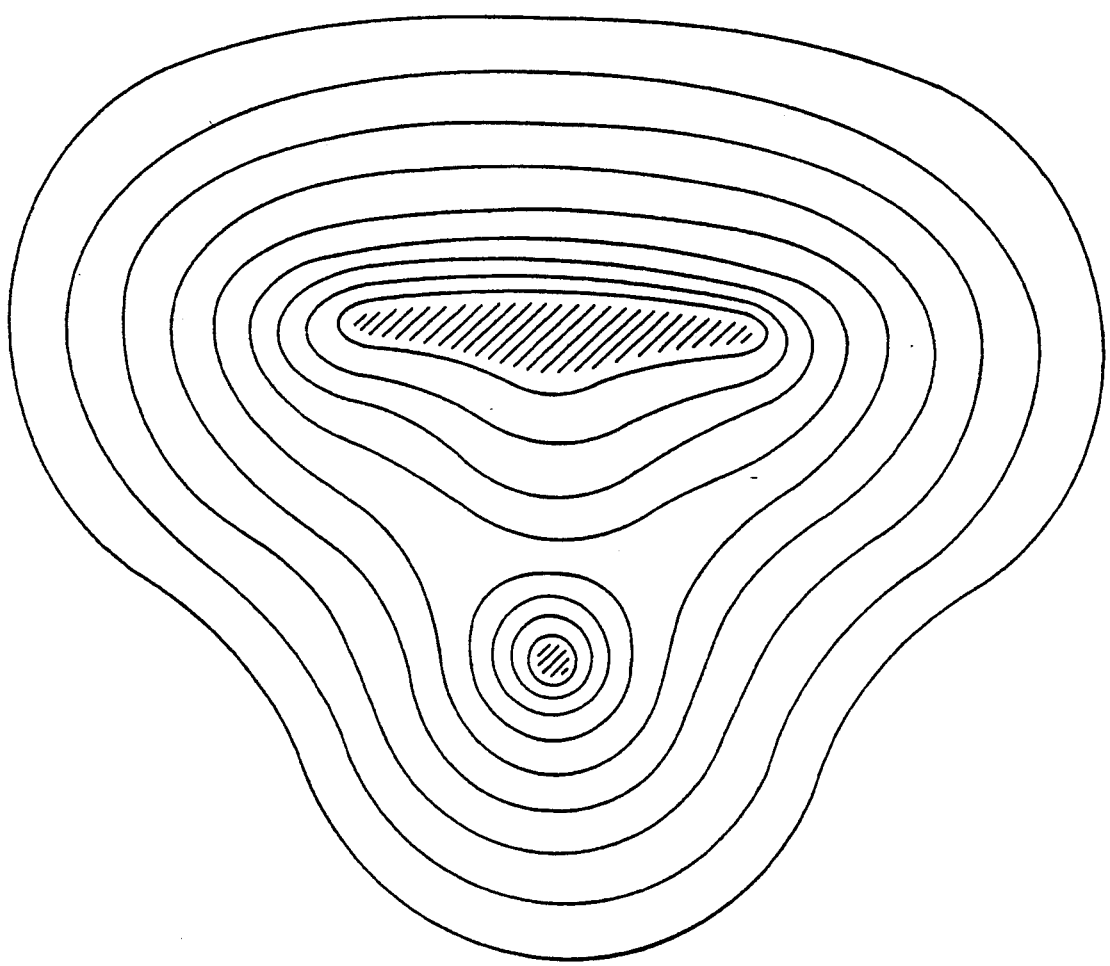
FIG. 5 is a schematic representation of a two-dimensional slice of the electric field potential generated by a typical configuration of bridge and bow antennae.

For this geometry, a small antenna and a roughly perpendicular moving antenna, it is not possible to solve Laplace's equation analytically, and it must be solved numerically, according to methods well known in the art, such as a relaxation technique. FIG. 5 shows schematically a two dimensional slice of the electric field potential for a typical configuration of bow and bridge electrodes. The capacitance is found by integrating around the antennae, to find the charge. FIG. 6 shows schematically the relationship between the capacitance $C_{bb}$ and the distance between the two electrodes 12 and 14.

In practice, it is beneficial to determine both radial and axial position by fitting a pair of functions to measured results, and then applying each function to measured voltages to work back to the location. In other words, measurements of $V_o$ and $V_{o2}$ were taken at a large combination of axial and radial locations of the bow. The radial distance of the bow from the bridge was plotted as a function of $V_o$ and $V_{o2}$ and a surface was obtained. The axial distance of the bow from a rest position was plotted as a function of $V_o$ and $V_{o2}$ and a second surface was obtained. For each surface, a third order polynomial was fitted to the surface. For subsequent measurements, once $V_o$ and $V_{o2}$ are measured, the functions are applied to the voltages, determining the variables radial distance from the bridge and axial distance from a reference position. Thus, the apparatus is calibrated before use to generate the two surfaces.

Rather than the two wire method, another method of disentanging the effects takes advantage of the fact that the impedance of the capacitance introduces a phase shift to the output signal. This method has the advantage that it does not require an additional wire to be connected to the tip of the bow. It has the disadvantage of requiring more complicated circuitry. Referring to equation 2 it can be seen that if $R_b$ changes due to axial motion of the bow, the output, $V_o$ will be in phase with the input, but the amplitude will differ. If the bow 8 and its electrode 14 move radially away from the bridge 6 and its electrode 12, both the magnitude and the phase of $V_o$ will change. The amplitude and phase shift of $V_o$ can be measured by phase measurement circuitry well known to those of ordinary skill in the art. The output of the phase measurement circuitry will provide knowledge about the phase and the amplitude of the output signal $V_o$. Knowing the amplitude and the phase shift of $V_o$ provides enough information to solve for the unknown quantities $R_b$ and $C_{bb}$, from which the position of the bow can be determined, as discussed above. Analysis of the phase results in the following expression:

$$V_o = -V_i((\omega R_a C_{bb})/\sqrt{(1+\omega^2 R_b^2 C^2)})e^{j\arctan(1/(\omega R_b C_{bb}))}. \quad (5)$$

Analysis of the real and complex parts of this complex expression provide the two equations necessary to determine $R_b$ and $C_{bb}$.

Figure 1A:
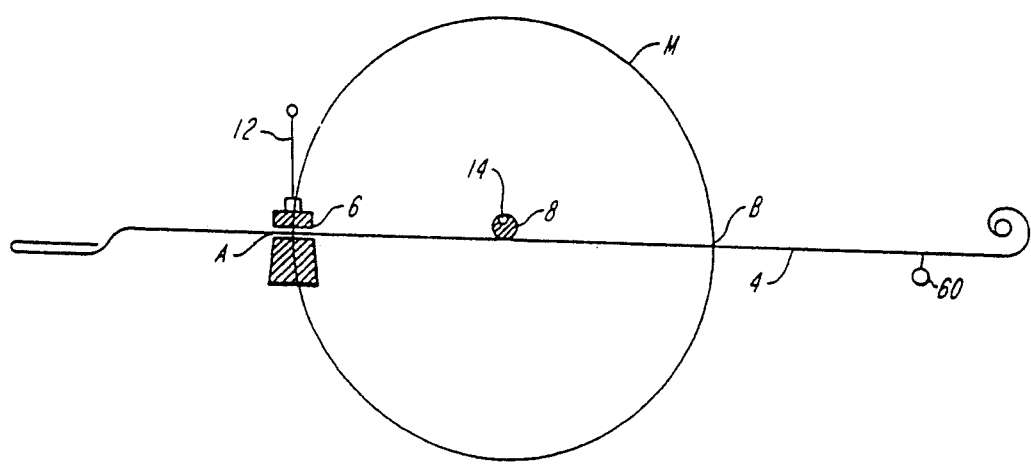
FIG. 1a is a schematic cross-sectional representation of the embodiment shown in FIG. 1.

The physical constraints of the cello system provide certain information, so that the location of the bridge transmitting antenna 12, both axially and radially, can be determined with respect to the bow 8 by using only a single axial electrode. These constraints are shown in FIG. 1a. Without any additional information, the apparatus of the invention can only specify the location of the bridge antenna with respect to the bow antenna as lying somewhere on a circle M, having a radius $R_x$, the radial distance between the two antennae. During play, the bow 8 rests on the strings 4, so that the bow 8 must be located in the plane of the strings. This resolves the location problem to choosing between points A and B. During play, the bow 8 is placed between the bridge 6 and the tuning pegs 60, near the neck of the cello. Thus, point B is ruled out because that would locate the bridge between the bow and the tuning peg. However, if the cellist were to place the bow at an unorthodox location, i.e. at B on the wrong side of the bridge with respect to the tuning peg, the apparatus of the invention would not be able to distinguish this placement from placement at A, unless additional axes are used, as discussed below.

Figure 7A:
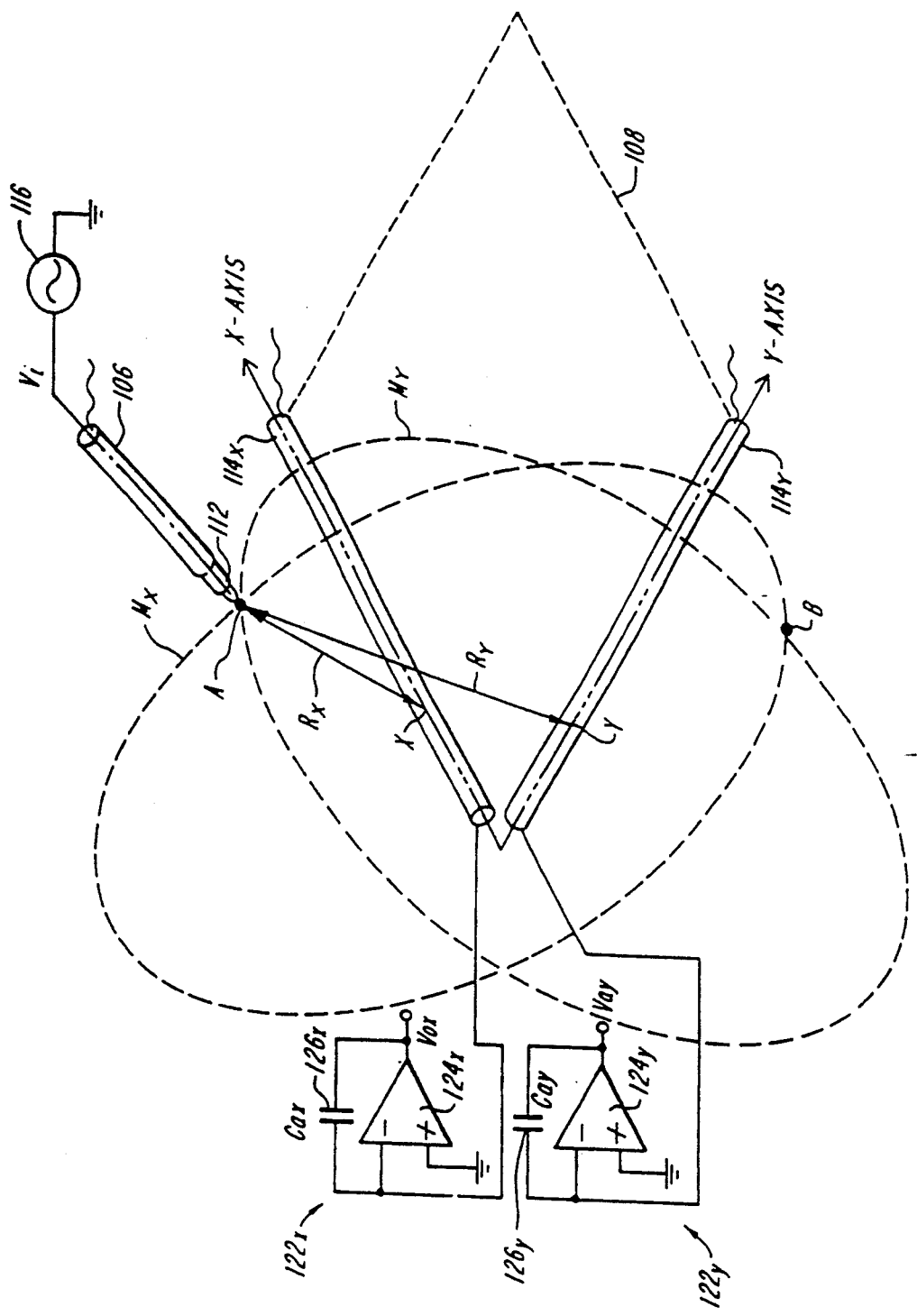
FIG. 7A shows an embodiment of the invention using two axial electrodes, for measuring the position of a point with respect to two axes.

Another preferred embodiment of the invention, shown schematically in FIG. 7A, is an apparatus for measuring the location of a point with respect to axes extended in two directions, such as a stylus with respect to a writing pad. A writing pad 108 is provided with a pair of resistive, extended body electrodes 114x and 114y. A stylus 106 is provided with a reference electrode 112. An oscillator 116 applies a signal to the reference electrode 112, which is coupled capacitively through the air to resistive extended electrodes 114x and 114y just as the bridge electrode 12 is coupled to the bow electrode 14 shown in FIG. 1. The signals out of the extended electrodes 114 are amplified by amplification circuits 122x and 122y, and the signals are analyzed just as are the signals with only one axis.

It will be necessary to either measure the signal out of both ends of the resistive strips, or the phase shift of each of the signals provided to the amplifiers 122. In operation, interaction between the stylus 112 and the electrode on one axis, e.g. 114y provides enough information to locate the point somewhere on a circle $M_y$ of radius $R_y$, centered at y, lying in a plane perpendicular to the y axis. Interaction between the stylus 112 and the electrode on the other axis provides enough information to locate the stylus somewhere on a second circle $M_x$ of radius $R_x$ and having a center at x along the x axis, lying in a plane perpendicular to the x axis. Combining both locations requires that the stylus be located either at point A or B. Since this is a physical system, constraints are provided that further locate the stylus. The stylus cannot be under the pad. Therefor, point B is not a proper candidate.

Thus, the two axis embodiment can track the location of the stylus anywhere (within the range of the operative capacitive effect) in the plane defined by the two axes, and above one side or the other, whichever has been chosen.

The foregoing shows that for applications without a physical constraint, such as the requirement to be on one side or the other of the pad, an apparatus having two axes can typically only identify two possible locations—, one above the plane defined by the two axes and one below. In the absence of a physical constraint, to resolve location between these two possibilities, a third axis, antenna and amplification stage are required.

Figure 7B:
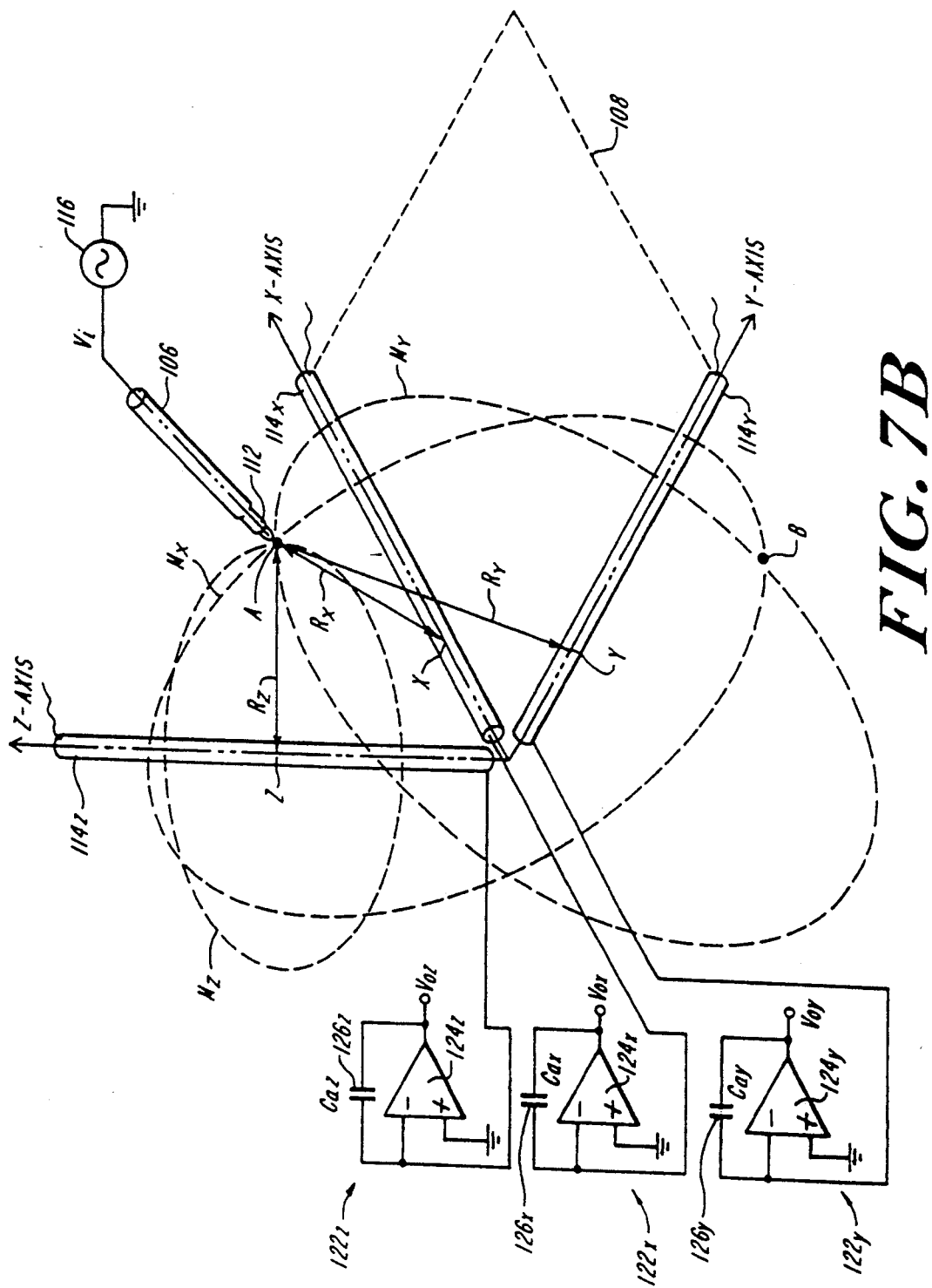
FIG. 7B shows an embodiment of the invention using three axial electrodes, for measuring the position of a point with respect to three axes.

A three axis embodiment is shown schematically in FIG. 7B. This embodiment is identical to the two axis embodiment shown in FIG. 7A, with the addition of a third axis antenna 114z and amplification stage 122z. The interaction between stylus 112 and the electrode on the z axis provides the information that the stylus lies somewhere on circle Mz, having a radius Rz, lying in a plane perpendicular to the z axis and centered at z. This eliminates the possibility that the stylus could be located at point B. Using this information and the information provided from the interaction between the stylus and antennae 114x and 114y, the system determines unambiguously that the stylus is located at point A, without the need for any requirement of a physical constraint, such as has been explained above.

Figure 8:
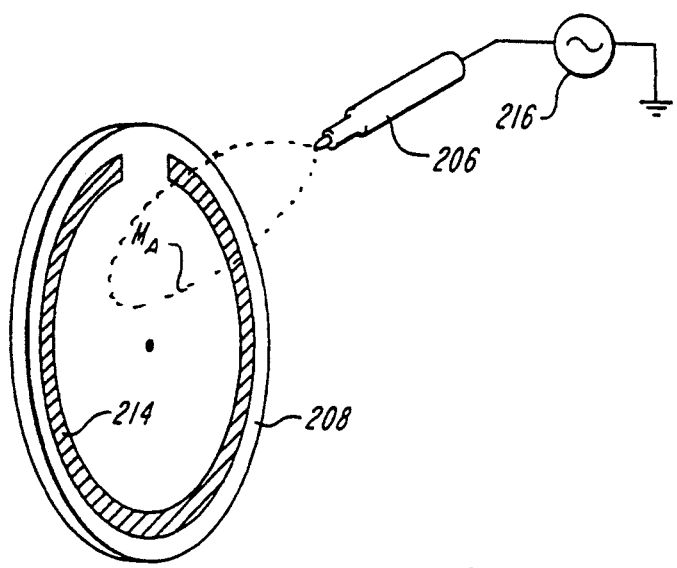
FIG. 8 shows a portion of an embodiment of the invention for measuring the angular position of an extended body that rotates in a plane.

Another preferred embodiment of the invention, useful for measuring the angular position of a point with respect to an axis, is shown in FIG. 8 As in the embodiments discussed above, an oscillator provides a signal to a reference electrode 206, which is linked capacitively to an extended object electrode 214, fixed to disk 208. As the disk rotates about its central axis, the capacitive coupling intersects the resistive electrode 214 at different locations along its length. The location can be determined in the same manner as was the location of the bow, when moving axially. From the location along the resistor, the angular position of the disk 208 with respect to the antenna 206 can be easily determined. As is the case with the rectilinear embodiments discussed above, the information gleaned from one, arcuate resistive electrode such as 214, can only specify the location of the point on a circle of Radius $R_A$ centered on the arcuate resistive electrode. To further specify the location, either additional axes, or some physical constraint must be present. For instance, if the transmitter 206 is stationary, a fixed distance from the disk, and lies on a line perpendicular to the disk that runs through the electrode, the angular position of the rotating disk can be determined.

In the foregoing discussion, it has been generally assumed that the resistive electrode fixed to the extended body has been of uniform composition, and uniform resistivity. Advantages can be obtained by varying the resistivity of the electrode along the length of the axis. For instance, if the extended object were situated such that as it moved closer to a terminus, it became more important to finely control its motion, a non-linear resistivity could be applied to the extended object, so that more precise location could be had at the location of most need. An example is the parking of a train car or other object near to the end of a track. As the train approaches the end of the track, it could be more accurately controlled, to avoid damage to the train or its environment from overrunning the stop. Other applications of this sort will be evident to one of skill in the art.

The resistivity can be varied by many techniques. Most simply, the cross-sectional area of the resistor can be varied along its length, either by varying the thickness or width. Typically, resistive polymers are made resistive by embedding resistive material within the polymer. The resistivity of the electrode can alternatively be varied by changing the degree of impregnation along the length of the resistor to achieve the desired results.

In addition to varying the resistivity of a circuit element, other signal propagation properties of the antenna can be varied as well. For instance, a transmission line may have a varying impedance and hence propagation time along its length. It will be understood that the location and orientation of a spatially extended rigid object in space can be described completely with respect to six degrees of freedom. It will be understood that the present invention can be applied to locate and orient such an object in space, by the use of at most six axial electrodes, of the type discussed above, or three axial electrodes and two transmitting antennae located a known distance apart on the object.

The foregoing should be considered illustrative and not limiting in any sense. For instance, the oscillator can be applied to the resistive axial antenna, rather than the receiving antenna. Any method of varying the transmission properties, such as resistivity of the extended resistor with respect to its spatial extension is within the contemplation of the invention. The invention is not limited to applications of human and instrument interface, and can be beneficially applied to machines.

Having described the invention, what is claimed is:

1. An apparatus for determining the position of a reference point with respect to at least one axis, said reference point and said at least one axis being movable relative to each other, said apparatus comprising:
   a. a reference electrode located at the reference point;
   b. at least one elongated antenna movable along said at least one axis, said elongated antenna:
      i. having a signal transmission property as measured between a first end of said elongated antenna and a variable measurement point along said axis, which signal transmission property varies with the location of the measurement point; and
      ii. capable of being electromagnetically coupled to said reference electrode;
   c. means for applying an input electric signal to said reference electrode to generate an electromagnetic field to be picked up by said elongated antenna;
   d. means for measuring an output electric signal at said first end of said at least one elongated antenna due to the detection of said field; and
   e. means for evaluating the relation between said output electric signal and said input electric signal to determine:
      i. the distance from said reference point relative to said axis along a line perpendicular to said axis; and
      ii. the distance from said first end of said elongated antenna to the intersection of said perpendicular line and said axis.

2. The apparatus of claim 1, said at least one elongated antenna comprising a first and at least a second elongated antenna fixed along a second axis at a known orientation with respect to said first elongated antenna, said second elongated antenna:
   a. having a signal transmission property as measured between a first end of said second elongated antenna and a variable measurement point along said second axis, which signal transmission property varies with the location of the measurement point; and
   b. capable of being electromagnetically coupled to said reference antenna.

3. The apparatus of claim 2, said means for measuring an output signal at said first end of said at least one elongated antenna comprising means for measuring an output signal at said first end of both of said elongated antennae.

4. The apparatus of claim 3, said means for evaluating the relation between said output electric signal from said at least one elongated antenna comprising means for evaluating the relation between said output electric signals at both of said elongated antennae and said input electric signal to determine the position of said reference point with respect to said first and at least second elongated antennae.

5. The apparatus of claim 1, said signal transmission property of said at least one elongated antenna being electrical resistance.

6. The apparatus of claim 5, said at least one elongated antenna having a resistivity that varies at different positions along the length of said antenna.

7. The apparatus of claim 1, said coupling between said reference electrode and said at least one elongated antenna being capacitive.

8. The apparatus of claim 1, said at least one elongated antenna having a uniform cross-sectional area along its length.

9. The apparatus of claim 1, said at least one elongated antenna having an aspect ratio of at least 25 to 1.

10. The apparatus of claim 1, said at least one elongated antenna comprising an arcuate shaped antenna.

11. The apparatus of claim 2, said at least one elongated antenna comprising a third elongated antenna movable along a third axis at a known orientation with respect to said first elongated antenna, said third elongated antenna:
   a. having a signal transmission property as measured between a first end of said third elongated antenna and a variable measurement point along said third axis, which signal transmission property varies with the location of the measurement point; and b. capable of being electromagnetically coupled to said reference antenna.

12. A method for determining the position of a reference point with respect to at least one axis, said reference point and said at least one axis being movable relative to each other, said method comprising the steps of:
 a. providing:
  i. a reference electrode located at the reference point;
  ii. at least one elongated antenna movable along said at least one axis, said elongated antenna:
   (a). having a signal transmission property as measured between a first end of said elongated antenna and a variable measurement point along said axis, which signal transmission property varies with the location of the measurement point; and
   (b). capable of being electromagnetically coupled to said reference electrode;
 b. applying an input electric signal to said reference electrode to generate an electromagnetic field to be picked up by said elongated antenna;
 c. measuring an output electric signal at said first end of said at least one elongated antenna due to the detection of said field and
 d. evaluating the relation between said output electric signal and said input electric signal to determine:
  i. the distance from said reference point relative to said axis along a line perpendicular to said axis; and
  ii. the distance from said first end of said elongated antenna to the intersection of said perpendicular line and said axis.

13. The method of claim 12, said step of evaluating the relation between said output signal and said input signal comprising the steps of:
 a. analyzing a first circuit including a first output signal present at said first end of said elongated antenna to generate an equation in two unknowns related to the radial distance of the reference point from the elongated antenna and the axial distance of the reference point along the elongated antenna from a rest location;
 b. analyzing a second circuit including a second output signal present at the second end of said elongated antenna to generate a second different equation in said two unknowns; and
 c. solving said two equations for said two unknowns.

14. The method of claim 12, said step of evaluating the relation between said output signal and said input signal comprising the steps of:
 a. analyzing a first circuit including a first output signal present at said first end of said elongated antenna, said first output signal related to the radial distance of the reference point from the elongated antenna and the axial distance of the reference point along the elongated antenna from a rest location;
 b. analyzing a second circuit including a second output signal present at the second end of said elongated antenna, said second output signal related to the radial distance of the reference point from the elongated antenna and the axial distance of the reference point along the elongated antenna from a rest location;
 c. generating a pair of functions, the first of said pair of functions relating the radial distance of said reference point from said axis to said first and second output signals present at said first and second ends of said elongated antenna, the second of said pair of functions relating the axial distance of said reference point from said rest location to said first and second output signals present at said first and second ends of said elongated antenna; and
 d. applying said functions to said first and second output signals at said first and second ends of said elongated antenna to determine the radial distance of the reference point from said elongated antenna and the axial distance of the reference point along said elongated antenna from said rest location.

15. The method of claim 14, wherein said step of generating a pair of functions comprises the steps of:
 a. for a wide variety of axial distances of said reference point along said elongated antenna from said rest location, measuring said first and second output signals present at said first and second ends of said elongated antenna and fitting a first function to said measured first and second output signal values; and
 b. for a wide variety of radial distances of said reference point from said elongated antenna, measuring said first and second output signals present at said first and second ends of said elongated antenna and fitting a second function to said measured first and second output signal values.

16. The method of claim 12, said step of evaluating the relation between said output electric signal and said input electric signal comprises the steps of:
 a. determining the capacitance between said reference electrode and said elongated antenna; and
 b. from said capacitance, determining the distance from said reference point relative to said axis along a line perpendicular to said axis.

* * * * *